United States Patent
Li et al.

(10) Patent No.: US 12,079,138 B2
(45) Date of Patent: *Sep. 3, 2024

(54) EFFICIENT ADDRESS TRANSLATION

(71) Applicant: Intel Corporation, Santa Clara, CA (US)

(72) Inventors: Jianhui Li, Shanghai (CN); Yong Wu, Shanghai (CN); Yihua Jin, Shanghai (CN); Xueliang Zhong, Shanghai (CN); Xiao Lin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,879

(22) Filed: Aug. 22, 2022

(65) Prior Publication Data

US 2022/0405210 A1     Dec. 22, 2022

Related U.S. Application Data

(63) Continuation of application No. 15/553,853, filed as application No. PCT/CN2015/075219 on Mar. 27, 2015, now Pat. No. 11,422,943.

(51) Int. Cl.
*G06F 12/10*     (2016.01)
*G06F 9/30*     (2018.01)
(Continued)

(52) U.S. Cl.
CPC .......... *G06F 12/10* (2013.01); *G06F 9/30174* (2013.01); *G06F 9/355* (2013.01);
(Continued)

(58) Field of Classification Search
CPC .................. G06F 12/10; G06F 9/45558; G06F 9/45554; G06F 2009/45583
See application file for complete search history.

(56) References Cited

U.S. PATENT DOCUMENTS 7,886,112 B2    2/2011    Ohtsuka
8,037,278 B2   10/2011    Greiner et al.
(Continued)

FOREIGN PATENT DOCUMENTS

CN        1494690 A    8/2008
CN     101960432 B    1/2011
(Continued)

OTHER PUBLICATIONS

International Search Report and Written Opinion issued in PCT Application No. PCT/CN2014/093373, dated Sep. 9, 2015, 12 pages.
(Continued)

*Primary Examiner* — David Yi
*Assistant Examiner* — Nicholas A. Paperno
(74) *Attorney, Agent, or Firm* — HANLEY, FLIGHT & ZIMMERMAN, LLC (57) ABSTRACT

An example system includes: interface circuitry; programmable circuitry; and instructions to cause the programmable circuitry to: reserve first memory addresses of a host system, the first memory addresses reserved for emulation of a guest system, the guest system based on a first instruction set architecture that is different from a second instruction set architecture of the host system; reserve second memory addresses of the host system that are contiguous with the first memory addresses, the second memory addresses reserved for a first emulated memory access instruction associated with an overflow in the guest system; reserve third memory addresses of the host system for a second emulated memory access instruction associated with an underflow in the guest system; and set memory access privileges of the second and third memory addresses to prevent at least one of a read, a write, or an execution access for the second and third memory addresses.

20 Claims, 2 Drawing Sheets

(51) Int. Cl.
  G06F 9/355 (2018.01)
  G06F 9/455 (2018.01)
(52) U.S. Cl.
  CPC ...... *G06F 9/45554* (2013.01); *G06F 9/45558* (2013.01); *G06F 2009/45583* (2013.01)

(56) References Cited

U.S. PATENT DOCUMENTS

| | | | |
|---|---|---|---|
| 8,402,248 | B2 | 3/2013 | Meier et al. |
| 8,706,900 | B2 | 4/2014 | Carver |
| 9,336,036 | B2 | 5/2016 | Dong et al. |
| 10,078,585 | B2 | 9/2018 | Greiner et al. |
| 11,422,943 | B2 | 8/2022 | Li et al. |
| 2002/0083421 | A1 | 6/2002 | Simons |
| 2008/0059769 | A1 | 3/2008 | Rymarczyk et al. |
| 2009/0119089 | A1 | 5/2009 | Gheith et al. |
| 2011/0320663 | A1 | 12/2011 | Brice, Jr. et al. |
| 2012/0198209 | A1 | 8/2012 | Abdallah |
| 2013/0185720 | A1 | 7/2013 | Tuch et al. |
| 2013/0227196 | A1 | 8/2013 | Zheng et al. |
| 2014/0122781 | A1 | 5/2014 | Smith et al. |
| 2014/0317374 | A1 | 10/2014 | Culley et al. |
| 2014/0379955 | A1 | 12/2014 | Dong et al. |
| 2016/0048458 | A1 | 2/2016 | Lutas et al. |
| 2016/0364276 | A1 | 12/2016 | Wu et al. |
| 2018/0052774 | A1 | 2/2018 | Li et al. |

FOREIGN PATENT DOCUMENTS

| | | |
|---|---|---|
| CN | 101326500 B | 5/2012 |
| CN | 101911022 B | 10/2012 |
| CN | 103765400 B | 5/2016 |
| CN | 103765401 B | 4/2017 |
| CN | 103597451 B | 6/2017 |
| CN | 103905312 A | 6/2017 |
| CN | 103907089 B | 7/2017 |
| CN | 107430521 A | 2/2022 |
| WO | 2012138950 A2 | 10/2012 |
| WO | 2012138952 A1 | 10/2012 |
| WO | 2016090554 A1 | 6/2016 |
| WO | 2016154795 A1 | 10/2016 |

OTHER PUBLICATIONS

International Search Report and Written Opinion issued in PCT Application No. PCT/CN2015/075219, dated Dec. 29, 2015, 11 pages.
International Preliminary Report on Patentability issued in PCT Application No. PCT/CN2014/093373, dated Sep. 9, 2015, 4 pages.
International Preliminary Report on Patentability issued in PCT Application No. PCT/CN2015/075219, dated Oct. 3, 2017, 5 pages.
Extended European Search Report received in European Patent Application No. 15/886,782, dated Nov. 14, 2018, 11 bages.
Jianjun Li et al: "Dynamic Register Promotion of Stack Variables", Code Generation and Optimization (CGO), 2011 9th Annual IEEE/ACM International Symposium on, IEEE, Apr. 2, 2011 (Apr. 2, 2011), pp. 21-31, XP031863929, DOI: 10.1109/CGO.2011.5764671 ISBN: 978-1-61284-356-8. 11 pages.
China National Intellectual Property Administration, "First Office Action," dated Aug. 28, 2020, in connection with Chinese Patent Application No. 201580077500, 10 pages.
European Patent Office, "Intention to Grant," dated Oct. 1, 2020, in connection with European Patent Application No. 15,886,782.0, 27 pages.
Li et al., "Dynamic Register Promotion of Stack Variables, International Symposium on Code Generation and Optimization," May 5, 2011, 11 pages.
China National Intellectual Property Administration, "Second Office Action," dated Jul. 16, 2021 in connection with Chinese Patent Application No. 201580077500.8, 8 pages, including English translation.
Chiao, et al., "Rose: A Novel Flash Translation Layer for NAND Flash Memory Based on Hybrid Address Translation", IEEE Transactions on Computers, vol. 60, No. 6, Jun. 2011, pp. 753-766, 14 pages.
China National Intellectual Property Administration, "Notice on Grant of Patent Right for Invention", in connection with China Application No. 201580077500.8, dated Nov. 23, 2021, 6 pages. (English abstract attached).
China National Intellectual Property Administration, "Patent Certificate", No. CN100743521B, in connection with China Application No. 201580077500.8, dated Feb. 18, 2022, 5 pages.
United States Patent and Trademark Office, "Non-Final Office Action," issued in connection with U.S. Appl. No. 15/553,853, dated Sep. 21, 2018, 11 pages.
United States Patent and Trademark Office, "Final Office Action," issued in connection with U.S. Appl. No. 15/553,853, dated Mar. 12, 2019, 12 pages.
United States Patent and Trademark Office, "Advisory Action," issued in connection with U.S. Appl. No. 15/553,853, dated Jun. 4, 2019, 3 pages.
United States Patent and Trademark Office, "Non-Final Office Action," issued in connection with U.S. Appl. No. 15/553,853, dated Jan. 9, 2020, 10 pages.
United States Patent and Trademark Office, "Final Office Action," issued in connection with U.S. Appl. No. 15/553,853, dated May 19, 2020, 11 pages.
United States Patent and Trademark Office, "Non-Final Office Action," issued in connection with U.S. Appl. No. 15/553,853, dated Feb. 18, 2021, 11 pages.
United States Patent and Trademark Office, "Final Office Action," issued in connection with U.S. Appl. No. 15/553,853, dated Jul. 13, 2021, 12 pages.
United States Patent and Trademark Office, "Notice of Allowance and Fee(s) Due," issued in connection with U.S. Appl. No. 15/553,853, dated Apr. 18, 2022, 8 pages.

EFFICIENT ADDRESS TRANSLATION

CROSS-REFERENCE TO RELATED APPLICATIONS

This patent arises from a continuation of U.S. patent application Ser. No. 15/553,853, filed Aug. 25, 2017, entitled "EFFICIENT ADDRESS TRANSLATION," (now U.S. Pat. No. 11,422,943) which is a U.S. National Stage Entry of PCT Application No. PCT/CN2015/075219, filed Mar. 27, 2015, entitled "EFFICIENT ADDRESS TRANSLATION." U.S. patent application Ser. No. 15/553,853 and PCT Application No. PCT/CN2015/075219 are hereby incorporated herein by reference in their entireties. Priority to U.S. patent application Ser. No. 15/553,853 and PCT Application No. PCT/CN2015/075219 is hereby claimed.

BACKGROUND

Computing devices such as portable computers, desktop computers, tablet computers, smartphones, etc., have an associated instruction set architecture (ISA). An ISA is a part of a computing device architecture related to programming, including the native data types, instructions, registers, addressing modes, memory architecture, interrupt and exception handling, and external I/O. ISAs typically have an associated native word size, for example, 32-bit, 64-bit, etc. The native word size is related to register size in bits as well as memory address size and corresponding capacity of a memory address space. Applications designed to execute on a selected computing device typically include instructions that correspond to the native word size of the computing device.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

It is sometimes desirable for applications associated with a first ISA ("guest ISA") to execute on a computing device associated with a second ISA ("host ISA") when the ISAs are not the same. The guest (i.e., source) ISA may have a native word size (in bits) that is less than the native word size of the host (i.e., target) ISA. For example, guest ISA may correspond to ARM® ARMv7 ISA (available from ARM® Holding, plc, Cambridge, United Kingdom) and host ISA may correspond to an X86-64 ISA (for example, Intel® X86-64 ISA available from Intel® Corporation, Santa Clara, California). The ARM® ARMv7 ISA has a 32-bit native word size and the Intel® X86-64 ISA has a 64 bit native word size.

Such execution may be accomplished by emulating guest operations on the host. Emulation includes translating instructions from the source ISA to the target ISA and translating memory addresses from the guest to the host. Instructions may differ between the ISAs, e.g., a LD instruction or a MOV instruction configured to load (i.e., move) contents of a memory location into a register. Numbers of bits in results of arithmetic operations correspond to native word sizes and thus, may differ. Memory addresses may differ since a size of memory and associated number of memory addresses are related to native word size and thus, to ISA. Translations may be performed statically by a compiler (i.e., prior to runtime) and/or dynamically (i.e., during runtime) by a just-in-time (JIT) compiler, by a guest operating system (OS) and/or by a virtual machine (VM), as described herein.

Translation may include adding one or more control prefix(es) to a target instruction configured to ensure emulation accuracy. For example, an operation control prefix may be added to a target instruction configured to ensure that arithmetic results are limited to the source ISA native word size. In another example, an address control prefix, configured to ensure that the translated address corresponds to a guest native address space, may be added to a target memory access instruction that includes a base±offset calculation. The control prefixes are configured to ensure that behavior resulting from execution of an emulated source ISA instruction is the same on the host as behavior resulting from execution of the source ISA on its native platform. Although providing a benefit, including such prefixes consumes computing device resources. Each prefix increases an amount of memory occupied by the application since at least the address control prefix may be added to each memory access instruction that includes a base±offset address calculation. Operations associated with decoding and/or executing the prefixes consume more processor resources. Further, the increased memory usage associated with the control prefixes may increase cache misses and thus increase latencies associated with memory accesses.

Generally, this disclosure relates to an efficient address translation. The methods and systems are configured to reduce a number of address control prefixes while ensuring accurate behavior resulting from execution of a source ISA instruction on a target ISA platform (i.e., computing device). In an embodiment, the address control prefix may be omitted from a memory access instruction that includes a base plus or minus (±) an offset calculation when the offset is a constant between zero and a maximum offset. In this embodiment, the address control prefix is included for memory access instructions when at least one of the offset is not a constant and/or the offset is not between zero and a maximum offset. A size (i.e., an amount) of the maximum offset is related to characteristics of an associated OS. For example, the maximum offset may be 4096. In another example, the maximum offset may be 8192. In another example, the maximum offset may be greater than or less than 4096. In another example, the offset may be greater than or less than 8192.

A memory address calculation that includes adding or subtracting an offset to or from a base address may result in an overflow, an underflow or neither an overflow nor an underflow. When there is neither underflow nor overflow, the resulting address points to a similar memory location in both the source address space and the target address space. Overflow may occur as a result of adding an offset to a base address if the sum of base address and offset is greater than a maximum allowable address addressable by the guest/source ISA. In other words, higher order bits are truncated so that the resulting address corresponds to a smaller address. Underflow may occur as a result of subtracting an offset from a base address if the offset is greater than the base address. In other words, the result is negative and when a result is negative, because of the manner in which negative numbers are represented in a computing device (e.g., two's complement, ones' complement), the highest order bit(s) are set, corresponding to a relatively large number positive number (i.e., unsigned integer).

As an illustrative example, a four bit source native word size, an eight bit target native word size and a base address of $0100_b$ may be considered. A maximum source address is $1111_b$ and a maximum target address is $1111\ 1111_b$, where the subscript b corresponds to binary. Overflow in the source platform address space may occur when an offset greater than or equal to $1100_b$ is added to the base address. In other words, the address calculation using the target native word size is $0000\ 0100_b + 0000\ 1100_b = 0001\ 0000_b$, likely an unreserved (i.e., user space) address in the target memory space. Since the result may be truncated for the source address, the four bit result is $0000_b$, corresponding to kernel reserved space in the source (guest) address space. Underflow may occur when an offset with an absolute value greater than $0100_b$ is subtracted from the base address. For example, using 2's complement for negative numbers, $0000\ 0100_b - 0000\ 0101_b = 0000\ 0100_b + 1111\ 1011_b = 1111\ 1111_b$, likely kernel space in the target memory. Since the result may be truncated for the source address, the four bit result is $1111_b$, corresponding to kernel space in the source memory.

In the source native architecture, overflow or underflow may trigger a memory access exception (i.e., fault) when the overflow or underflow results in an address that points to reserved memory space. For example, reserved memory space may include source kernel reserved memory in low memory, i.e., memory addresses at or near zero, and source kernel space in high memory, i.e., memory addresses at or near a maximum allowable address. Source kernel reserved may thus correspond to an overflow zone and source kernel space may correspond to an underflow zone. Respective size(s) of the source kernel reserved memory and source kernel space may be related to architecture and/or OS. The target architecture may similarly include reserved memory space: target kernel reserved in low memory and target kernel space in high memory. Applications generally do not have permission to access reserved memory space. Thus, an address that points to reserved memory space may draw a memory access exception that may then be communicated to the application attempting the access. Such reserved memory space may be managed by, for example, an OS and/or VMM (virtual machine monitor).

Without emulation, memory address calculations (i.e., base±offset) configured for a source ISA may produce a different result when executed on a target platform associated with a target ISA. For example, a base address plus offset calculation that may cause an overflow (base+offset>maximum memory address) on a source platform may instead point to a memory location in user space on the target platform. In another example, a base address minus offset calculation that may cause an underflow on the source platform may similarly cause an underflow on the target platform. Although the resulting addresses that caused the underflow may not be the same address, they both result in a memory access exception. In other words, they both result in a same behavior.

Methods and systems according to the present disclosure are configured to provide an overflow zone and an underflow zone in target memory address space that are related to respective overflow and underflow zones in source memory address space. A maximum offset value is related to size(s) of the target overflow zone and underflow zone, as described herein. Because the target native word is larger than the source native word, a base plus offset calculation may not overflow on the target, rather may point to a memory location in user space at a higher memory address than a maximum source memory address. A target overflow zone may be defined that starts at an upper limit of source memory address space and has a size related to the maximum offset, as described herein. The target overflow zone may be emulated by setting memory access privileges for memory locations in this zone to prevent read, write and/or execution access. For example, memory access privileges may be set as no read, no write and no execution privileges via a memory protection system call. Thus, a memory address result that points the target overflow zone may draw a memory access exception without an address control prefix.

Thus, guest memory address calculations that include a base address±offset, where the offset is constant and between zero and a maximum offset, may be accurately emulated without an address control prefix. Operations associated with validation of the address translation may be avoided. Guest memory address calculations where the offset is not constant and/or is not within the range of zero to maximum offset may include the address control prefix. Thus, memory usage may be decreased, processor resources may be freed and cache misses may be mitigated. Further, accurate emulation may be achieved without additional validation operations configured to confirm accuracy of a result.

Figure 1:
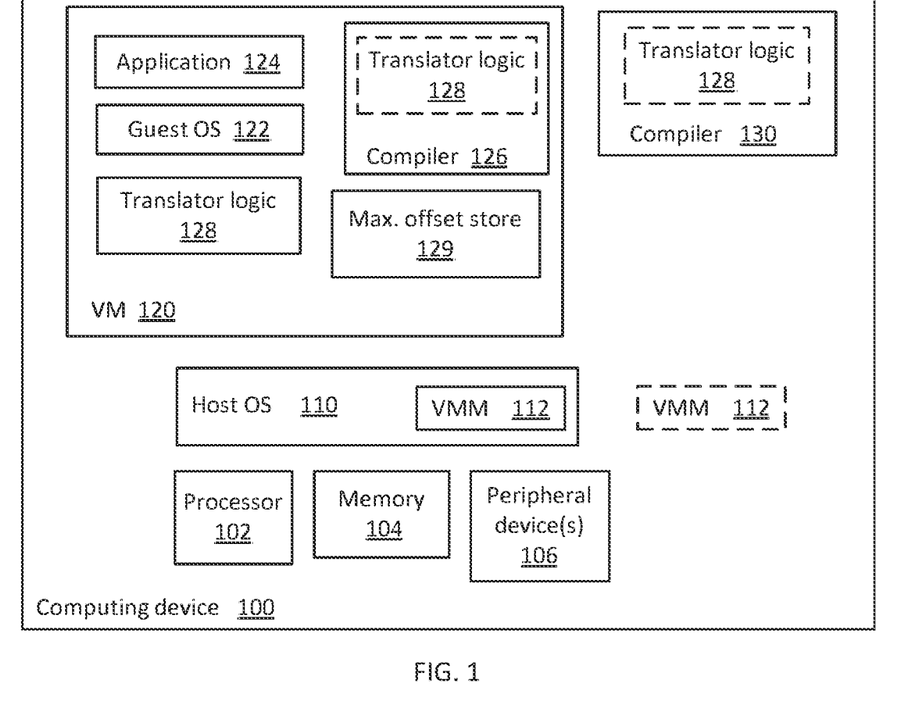
FIG. 1 illustrates a functional block diagram of a computing device according to various embodiments of the present disclosure.

FIG. 1 illustrates a system block diagram of a computing device 100 according to various embodiments of the present disclosure. Computing device 100 may include, but is not limited to, a server, a workstation computer, a desktop computer, a laptop computer, a tablet computer (e.g., iPad®, GalaxyTab® and the like), an ultraportable computer, an ultramobile computer, a netbook computer and/or a subnotebook computer, a mobile telephone including, but not limited to, a smart phone, (e.g., iPhone®, Android®-based phone, Blackberry®, Symbian®-based phone, Palm®-based phone, etc.), etc.

Computing device 100 includes processor 102, memory 104, one or more peripheral device(s) 106, host operating system (OS) 110, virtual machine (VM) 120 and compiler 130. Processor 102 is configured to perform operations associated with computing device 100. Peripheral devices 106 may include, for example, user interface device(s) including a display, a touch-screen display, printer, keypad, keyboard, etc., sensor(s) including accelerometer, global positioning system (GPS), gyroscope, etc., input/output (I/O) port(s), communication logic, wired and/or wireless, storage device(s) including hard disk drives, solid-state drives, removable storage media, etc. Memory 104 includes any type of memory technology, as described herein.

Computing device 100 may further include virtual machine monitor (VMM) 112. In an embodiment, VMM 112 may correspond to and/or be included in host OS 110. In another embodiment, VMM 112 may not be included in host OS 110. VM 120 hosts a guest OS 122 and an application 124. VM 120 may further host compiler 126 and/or translator logic 128. In some embodiments, translator logic 128 may be included in compiler 126. In some embodiments, translator logic 128 may be included in VM 120 and not in compiler 126. In some embodiments, translator logic 128 may be included in compiler 130, i.e., may not be included in VM 120. For example, compiler 130 may correspond to a static compiler. In another example, compiler 126 may correspond to a just-in-time (JIT) compiler. The VMM (i.e., hypervisor) 112 is configured to provide an interface between VM 120 and circuitry associated with computing device 100. In other words, the VMM 112 is configured to manage access to processor 102, memory 104 and/or peripheral device(s) 106 by VM 120.

Host OS 110 is configured to execute on processor 102 thus, a host native word size of host OS 110 and processor 102 may be the same. The host native word size may thus correspond to the host ISA word size and the computing device 100 register word size. The host native word size may include a number, m, bits. For example, m may be greater than or equal to four. For example, m may be equal to sixty four (64). Guest OS 122 may have an associated guest native word size of n bits, where n is less than m. For example, n may be greater than or equal to four. For example, n may be equal to thirty two (32). Application 124 may include instructions that correspond to the guest ISA.

VM 120 is configured to provide a guest execution environment of guest OS 122 and application 124. In other words, VM 120 may be configured to support guest OS 122 and application 124 while executing on computing device 100. VM 120 is configured to execute on processor 102 and to interact with host OS 110 and/or VMM 112. In an embodiment, VM 120 may correspond to a process VM. Compiler 126 is configured to compile, e.g., application 124 and/or guest OS 122 to execute on processor 102. For example, compiler 126 may correspond to a dynamic (just-in-time) compiler. In an embodiment, compiler 126 may include translator logic 128. In another embodiment, guest OS 122 may include translator logic. In another embodiment, VMM 112 may include translator logic 128.

Figure 2:
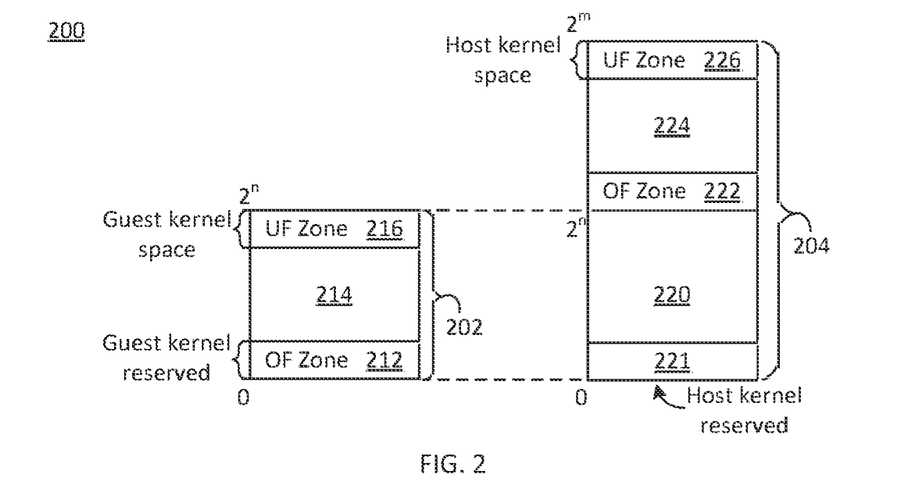
FIG. 2 is a memory diagram illustrating source (guest) and target (host) memory architectures according to various embodiments of the present disclosure.

The following description may be best understood when viewed in combination with FIG. 2. Initially, translator logic 128 is configured to select, determine and/or set the maximum offset. The maximum offset may then be stored in maximum offset store 129. The maximum offset is related to the host (target) ISA and/or the guest (source) ISA. Thus, the maximum offset may be related to the host OS and/or the source OS. In other words, the maximum offset is related to a size of reserved memory. For example, an OS may reserve one or more pages of high memory as kernel space ("kernel space"), e.g., to host the kernel. In another example, the OS may reserve one or more pages of low memory for kernel purposes ("kernel reserved"). Translator logic 128 may then be configured to determine the maximum offset based, at least in part, on a size of the kernel space and/or a size of the kernel reserved region. For example, the maximum offset may be less than or equal to a minimum of the size of the guest kernel space and the size of the guest kernel reserved. In another example, the maximum offset may be less than or equal to a minimum of the size of the guest kernel space, the size of the guest kernel reserved, the size of the host kernel space and a size of a created OF zone in the host, as described herein. In another example, a first maximum offset related to an offset configured to be added to the base address may be determined and a second maximum offset related to an offset configured to be subtracted from the based address may be determined. Continuing with this example, the first maximum offset may be less than or equal to a minimum of the size of guest kernel space and the size of the host kernel space and the second maximum offset may be less than or equal to a minimum of the guest kernel reserved and the created OF zone. The maximum offset is configured to ensure, inter alia, that a memory address calculation (i.e., base minus offset) that would result in an underflow and a memory access exception on a guest platform results in a host address that is in the host kernel space and thus draws a corresponding memory access exception on the host, i.e., computing device 100.

Translator logic 128 is further configured to create an OF zone in the host address space configured to emulate a guest kernel reserved region. A size of the created OF zone may be related to the maximum offset (i.e., a maximum offset value), as described herein. For example, translator logic 128 may be configured to request that access privileges to memory locations included in the OF zone be set to prevent (i.e., deny) any read, write and/or execution access. In this manner, an address translation that results in a host address in the OF zone is configured to draw a memory access exception. For example, a base plus offset operation that results in an overflow may then draw the memory access exception based, at least in part, on the privileges settings. Thus, an emulated memory access instruction that would draw an exception on a guest platform will draw a similar exception on computing device 110.

FIG. 2 is a memory diagram 200 illustrating source (guest) 202 and target (host) 204 memory architectures consistent with various embodiments of the present disclosure. Target memory 204 corresponds to memory 104 of FIG. 1. Source memory 202 includes $2^n$ memory locations. Low memory (i.e., near address zero) corresponds to a kernel reserved region and high memory (i.e., near address $2^n$) corresponds to guest kernel space. The kernel reserved region corresponds to an overflow (OF) zone 212 and the guest kernel space corresponds to a underflow (UF) zone 216, as described herein. Guest memory 202 may thus include three regions: OF zone 212, UF zone 216 and a user space 214.

The initializations of translator logic 128 are configured to emulate guest OF zone 212 and guest UF zone 216 in target memory 204. Target memory 204 includes $2^m$ memory locations where m is greater than n. Target memory 204 includes a first user memory region 220, a target kernel reserved region 221, a second user memory region 224 and a host kernel space in upper memory that corresponds to a host UF zone 226. In an embodiment, target memory 204 may include an OF zone 222 located adjacent to (and above) memory location $2^n$. Memory access privileges for OF zone 222 may be set to cause memory access attempts to draw a memory access exception, as described herein. The maximum offset may be related to one or more of a size of OF zone 212, a size of UF zone 216, a size of OF zone 222 and/or a size of UF zone 226, as described herein. For example, a size of OF zone 222 may be selected (i.e., defined) to limit an amount of host memory space occupied by OF zone 222. The maximum offset may then likewise be limited to less than or equal to the size of the OF zone 222.

It should be noted that there is not a one-to-one correspondence between memory locations in guest address space 202 and memory locations in host address space 204. Rather, host address space 204 is configured to emulate guest address space 202. In other words, if a memory address corresponds to user space 214 in guest memory space 202, a corresponding memory address in host address space 204 may also correspond to user space 220 or 224. Further, a host memory address that corresponds to a guest memory address that draws a memory access exception in guest address space 202 is configured to draw a memory access exception in host address space 204, as described herein.

Turning again to FIG. 1, in operation, for example when application 124 is executing, guest OS 122 is configured to fetch and decode instructions related to application 124. Translator logic 128 is configured to determine whether an instruction is a memory access instruction, and if so, to determine whether the instruction includes a base±offset address calculation. If the instruction includes a base±offset address calculation, translator logic 128 is configured to determine whether (or not) to add an address control prefix. Translator logic 128 is further configured to manage translation of the instruction (and address) from guest ISA to host ISA.

For example, translator logic 128 may be configured to add the address control prefix to a memory access instruction that is a base±offset type instruction when the offset is not a constant and/or the offset is not between zero and the maximum offset. Translator logic 128 may be further configured to translate the base±offset as a guest address operation. In other words, the address control prefix is configured to ensure address calculation is limited to the native word size of the guest ISA. The instruction may then be translated into a target ISA instruction.

In another example, translator logic 128 may be configured to not add the address control prefix to a memory access instruction that is a base±offset type instruction when the offset is a constant and the offset is between zero and the maximum offset. Translator logic 128 may be further configured to translate the base±offset as a host address operation. In other words, the address calculation may be performed using the native word size of the host ISA. An address result that would draw a memory access exception on the guest platform is configured to draw a memory access exception on computing device 100, as described herein. Address calculations may thus be emulated by computing platform 100 with associated host ISA.

Thus, universal addition of address control prefixes may be avoided by appropriate selection of the maximum offset and setting memory access privileges of OF zone 222. Accurate emulation of memory access operations associated with the guest ISA may thus be provided by computing device 100 that corresponds to a host ISA.

Figure 3:
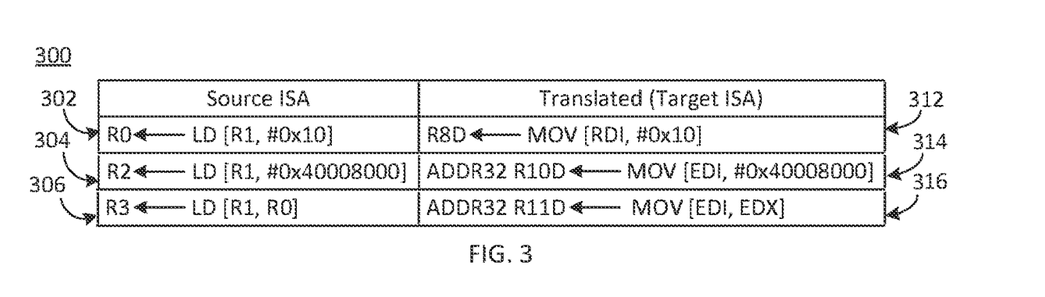
FIG. 3 illustrates three example source ISA instruction translations according to one embodiment of the present disclosure.

FIG. 3 illustrates three example source ISA translations 300 according to one embodiment of the present disclosure. For example, the source ISA instructions may correspond to an ARMv7 ISA that has a 32 bit native word size and the target ISA may correspond to an X86-64 ISA that has a 64 bit native word size. The maximum offset for these examples is 4096 (i.e., 0x800) and all three examples are memory access instructions (i.e., load instructions) that include base±offset calculations. Thus, all three examples are candidates for analysis by translator logic 128, as described herein.

A first source ISA instruction 302 corresponds to a first translated target ISA instruction 312. The offset for the first source ISA instruction 302 is 0x10 and 0x10 is a constant greater than zero and less than 0x800, thus the first source ISA instruction may be translated to the target ISA without adding an address control prefix. The first translated target ISA instruction 312 illustrates this result. Instruction 312 is a MOV instruction configured to move the contents of a target memory location pointed to by the contents of register RDI plus offset 0x10 into register R8D. The translation may be performed as a host address calculation, i.e., as a 64-bit calculation.

A second source ISA instruction 304 corresponds to a second translated target ISA instruction 314. The offset for the second source ISA instruction 304 is 0x40008000 and 0x40008000 is greater than 0x800, thus an address control prefix (e.g., ADDR32) may be prepended to the translated second source ISA instruction. The second translated target ISA instruction 314 illustrates this result. Instruction 314 is a MOV instruction configured to move the contents of a target memory location pointed to by the contents of register EDI plus offset 0x40008000 into register R10D. The translation may be performed as a guest address calculation (i.e., as a 32-bit calculation) and the address control prefix is configured to ensure that the emulation is accurate.

A third source ISA instruction 306 corresponds to a third translated target ISA instruction 316. The offset for the third source ISA instruction 306 is contained in register EDX and may not be constant, thus the address control prefix, ADDR32, may be prepended to the translated third source ISA instruction 316. The third translated target ISA instruction 316 illustrates this result. Instruction 316 is a MOV instruction configured to move the contents of a target memory location pointed to by the contents of register EDI plus the contents of register EDX into register R11D. The translation may be performed as a guest address calculation and the address control prefix is configured to ensure that the emulation is accurate.

Thus, a number of address control prefixes may be reduced while ensuring accurate behavior resulting from execution of a source ISA instruction on a target ISA platform (i.e., computing device 100) when a native word size of the source ISA is smaller than the native word size of the target ISA. The address control prefix may be omitted from a memory access instruction when the address corresponds to a base plus or minus (±) an offset and the offset is a constant between zero and a maximum offset, as described herein.

Figure 4:
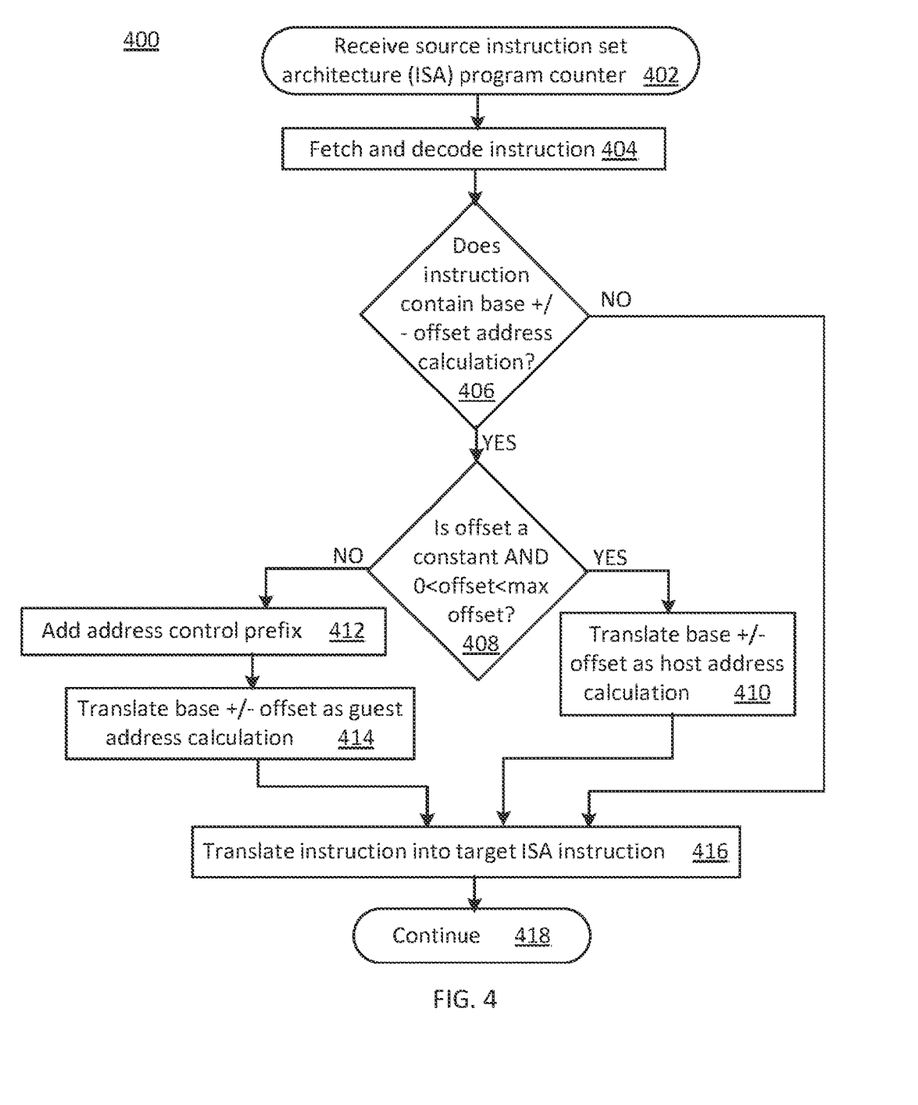
FIG. 4 is a flowchart of efficient address translation operations according to various embodiments of the present disclosure.

FIG. 4 is a flowchart 400 of efficient address translation operations according to various embodiments of the present disclosure. The operations may be performed, for example, by computing device 100, in particular, translator logic 128, compiler 126, guest OS 122, VM 120 and/or compiler 130 of FIG. 1.

Operations of this embodiment may begin with receiving a source ISA program counter 402. A program counter is configured to point to a next instruction. The next instruction may be fetched and decoded at operation 404. Whether the instruction contains a base plus or minus (±) offset address calculation may be determined at operation 406. If the instruction does not contain a base±offset address calculation, program flow may proceed to operation 416. If the instruction does contain a base±offset address calculation, whether the offset is a constant and between zero and a maximum offset may be determined at operation 408. If the offset is a constant and is in the range between zero and the maximum offset, the base±offset may be translated as a host (i.e., target) address calculation at operation 410. In other words, the calculation may be performed using the host native word size and may yield a host native word size result. An address control prefix may not be added to the translated instruction, i.e., the address control prefix may be omitted. Program flow may then proceed to operation 416. If the offset is not a constant and/or the offset is not in the range between zero and maximum offset, an address control prefix may be added at operation 412. The address control prefix is configured to constrain the address calculation and a result of the address calculation to a guest native word size, as described herein. The base±offset may be translated as a guest address calculation at operation 414, i.e., may be limited to the guest native word size. Program flow may then proceed to operation 416. The instruction may be translated into a target ISA instruction at operation 416. Program flow may then continue at operation 418.

Thus, at least some guest memory address calculations that include a base address±offset may be accurately emulated without an address control prefix. Guest memory address calculations where the offset is not constant and/or is not within the range of zero to maximum offset may include the address control prefix. Thus, memory usage may be decreased, processor resources may be freed and cache misses may be mitigated.

While the flowchart of FIG. 4 illustrates operations according various embodiments, it is to be understood that not all of the operations depicted in FIG. 4 are necessary for other embodiments. In addition, it is fully contemplated herein that in other embodiments of the present disclosure, the operations depicted in FIG. 4, and/or other operations described herein may be combined in a manner not specifically shown in any of the drawings, and such embodiments may include less or more operations than are illustrated in FIG. 4. Thus, claims directed to features and/or operations that are not exactly shown in one drawing are deemed within the scope and content of the present disclosure.

VMM 112 may be configured to manage system resources and control tasks that are run an VM 120, and/or system, e.g., computing device 100. VMM 112 may provide a layer of abstraction for underlying hardware to various virtual machines, e.g., VM 120. Guest OS may be implemented using Microsoft Windows®, HP-UX®, Linux®, UNIX®, Android®, Windows Phone®, ARM®v7 although other operating systems may be used.

Memory 104 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, this disclosure generally relates to an efficient address translation. The methods and systems are configured to reduce a number of address control prefixes while ensuring accurate behavior resulting from execution of a source ISA instruction on a target ISA platform (i.e., computing device). The address control prefix may be omitted from a memory access instruction when the address corresponds to a base±an offset and the offset is a constant between zero and a maximum offset. The address control prefix may be included for memory access instructions when the address corresponds to a base±an offset and at least one of the offset is not a constant and/or the offset is not between zero and a maximum offset.

EXAMPLES

Examples of the present disclosure include subject material such as a method, means for performing acts of the method, a device, or of an apparatus or system related to efficient address translation, as discussed below.

Example 1

According to this example there is provided a device. The device includes a processor; a memory and translator logic. The processor is to execute a host instruction set. The translator logic is to determine whether an offset is a constant and whether the offset is greater than zero and less than a maximum offset in response to receiving a guest memory access instruction that contains a base address plus or minus the offset. The maximum offset is related to at least one of a host instruction set architecture (ISA) and a guest ISA.

Example 2

This example includes the elements of example 1, wherein the translator logic is further to translate the base address plus or minus the offset as a host address calculation if the offset is a constant and the offset is greater than zero and less than the maximum offset.

Example 3

This example includes the elements of example 1, wherein the translator logic is further to add an address control prefix to a corresponding host memory access instruction if at least one of the offset is not a constant and/or the offset is not greater than zero and less than the maximum offset; and the translator logic is further to translate the base address plus or minus the offset as a guest address calculation.

Example 4

This example includes the elements according to any one of examples 1 through 3, wherein the translator logic is further to translate the guest memory access instruction from a source ISA into a target ISA.

Example 5

This example includes the elements according to any one of examples 1 through 3, wherein a native word size of the guest ISA is less than a native word size of the host ISA, the guest memory access instruction related to the guest ISA.

Example 6

This example includes the elements according to any one of examples 1 through 3, wherein the translator logic is further to define an overflow (OF) zone and an underflow (UF) zone in the memory, the OF zone and the UF zone related to the maximum offset.

Example 7

This example includes the elements of example 6, wherein the translator logic is further to set memory access privileges of the OF zone to prevent read, write and execution access.

Example 8

This example includes the elements of example 6, wherein the UF zone corresponds to a host kernel space.

Example 9

This example includes the elements according to any one of examples 1 through 3, wherein a native word size of the guest ISA is 32 bits and a native word size of the host ISA is 64 bits.

Example 10

This example includes the elements of example 9, wherein the guest ISA corresponds to an ARMv7 ISA and the host ISA corresponds to an x86-64 ISA.

Example 11

This example includes the elements according to any one of examples 1 through 3, wherein the translator logic is included in a virtual machine (VM).

Example 12

This example includes the elements according to any one of examples 1 through 3, wherein the translator logic is included in at least one of a dynamic compiler and a static compiler.

Example 13

This example includes the elements according to any one of examples 1 through 3, wherein the maximum offset is 4096.

Example 14

According to this example there is provided a method. The method includes determining, by translator logic, whether an offset is a constant and whether the offset is greater than zero and less than a maximum offset in response to receiving a guest memory access instruction that contains a base address plus or minus the offset. The maximum offset is related to at least one of a host instruction set architecture (ISA) and a guest ISA.

Example 15

This example includes the elements of example 14, and further includes translating, by the translator logic, the base address plus or minus the offset as a host address calculation if the offset is a constant and the offset is greater than zero and less than the maximum offset.

Example 16

This example includes the elements of example 14, and further includes adding, by the translator logic, an address control prefix to a corresponding host memory access instruction if at least one of the offset is not a constant and/or the offset is not greater than zero and less than the maximum offset; and translating, by the translator logic, the base address plus or minus the offset as a guest address calculation.

Example 17

This example includes the elements of example 14, and further includes translating, by the translator logic, the guest memory access instruction from a source ISA into a target. ISA.

Example 18

This example includes the elements of example 14, wherein a native word size of the guest ISA is less than a native word size of the host ISA, the guest memory access instruction related to the guest ISA.

Example 19

This example includes the elements of example 14, and further includes defining, by the translator logic, an overflow (OF) zone and an underflow (UF) zone in a memory, the OF zone and the UF zone related to the maximum offset.

Example 20

This example includes the elements of example 19, and further includes setting, by the translator logic, memory access privileges of the OF zone to prevent read, write and execution access.

Example 21

This example includes the elements of example 19, wherein the UF zone corresponds to a host kernel space.

Example 22

This example includes the elements of example 14, wherein a native word size of the guest ISA is 32 bits and a native word size of the host ISA is 64 bits.

Example 23

This example includes the elements of example 22, wherein the guest ISA corresponds to ARMv7 ISA and the host ISA corresponds to an x86-64 ISA.

Example 24

This example includes the elements of example 14, wherein the translator logic is included in a virtual machine (VM).

Example 25

This example includes the elements of example 14, wherein the translator logic is included in at least one of a dynamic compiler and a static compiler.

Example 26

This example includes the elements of example 14, wherein the maximum offset is 4096.

Example 27

According to this example there is provided a device. The device includes a computer readable storage device having stored thereon instructions that when executed by one or more processors result in the following operations including: determining whether an offset is a constant and whether the offset is greater than zero and less than a maximum offset in response to receiving a guest memory access instruction that contains a base address plus or minus the offset, the maximum offset related to at least one of a host instruction set architecture (ISA) and a guest ISA.

Example 28

This example includes the elements of example 27, wherein the instructions that when executed by one or more processors results in the following additional operations including translating the base address plus or minus the offset as a host address calculation if the offset is a constant and the offset is greater than zero and less than the maximum offset.

Example 29

This example includes the elements of example 27, wherein the instructions that when executed by one or more processors results in the following additional operations including adding an address control prefix to a corresponding host memory access instruction if at least one of the offset is not a constant and/or the offset is not greater than zero and less than the maximum offset; and translating the base address plus or minus the offset as a guest address calculation.

Example 30

This example includes the elements according to any one of examples 27 through 29, wherein the instructions that when executed by one or more processors results in the following additional operations including translating the guest memory access instruction from a source ISA into a target ISA.

Example 31

This example includes the elements according to any one of examples 27 through 29, wherein a native word size of the guest ISA is less than a native word size of the host ISA, the guest memory access instruction related to the guest ISA.

Example 32

This example includes the elements according to any one of examples 27 through 29, wherein the instructions that when executed by one or more processors results in the following additional operations including defining an overflow (OF) zone and an underflow (UF) zone in a memory, the OF zone and the UF zone related to the maximum offset.

Example 33

This example includes the elements of example 32, wherein the instructions that when executed by one or more processors results in the following additional operations including setting memory access privileges of the OF zone to prevent read, write and execution access.

Example 34

This example includes the elements of example 32, wherein the UF zone corresponds to a host kernel space.

Example 35

This example includes the elements according to any one of examples 27 through 29, wherein a native word size of the guest ISA is 32 bits and a native word size of the host ISA is 64 bits.

Example 36

This example includes the elements of example 35, wherein the guest ISA corresponds to an ARMv7 ISA and the host ISA corresponds to an x86-64 ISA.

Example 37

This example includes the elements according to any one of examples 27 through 29, wherein the translator logic is included in a virtual machine (VM).

Example 38

This example includes the elements according to any one of examples 27 through 29, wherein the translator logic is included in at least one of a dynamic compiler and a static compiler.

Example 39

This example includes the elements according to any one of examples 27 through 29, wherein the maximum offset is 4096.

Example 40

According to this example there is provided a device. The device includes means for determining, by translator logic, whether an offset is a constant and whether the offset is greater than zero and less than a maximum offset in response to receiving a guest memory access instruction that contains a base address plus or minus the offset. The maximum offset is related to at least one of a host instruction set architecture (ISA) and a guest ISA.

Example 41

This example includes the elements of example 40, and further includes means for translating, by the translator logic, the base address plus or minus the offset as a host address calculation if the offset is a constant and the offset is greater than zero and less than the maximum offset.

Example 42

This example includes the elements of example 40, and further includes means for adding, by the translator logic, an address control prefix to a corresponding host memory access instruction if at least one of the offset is not a constant and/or the offset is not greater than zero and less than the maximum offset; and means for translating, by the translator logic, the base address plus or minus the offset as a guest address calculation.

Example 43

This example includes the elements according to any one of examples 40 through 42, and further includes means for translating, by the translator logic, the guest memory access instruction from a source ISA into a target ISA.

Example 44

This example includes the elements according to any one of examples 40 through 42, wherein a native word size of the guest ISA is less than a native word size of the host ISA, the guest memory access instruction related to the guest ISA.

Example 45

This example includes the elements according to any one of examples 40 through 42, and further includes means for defining, by the translator logic, an overflow (OF) zone and an underflow (UF) zone in a memory, the OF zone and the UF zone related to the maximum offset.

Example 46

This example includes the elements of example 45, and further includes means for setting, by the translator logic, memory access privileges of the OF zone to prevent read, write and execution access.

Example 47

This example includes the elements of example 45, wherein the UF zone corresponds to a host kernel space.

Example 48

This example includes the elements according to any one of examples 40 through 42, wherein a native word size of the guest ISA is 32 bits and a native word size of the host ISA is 64 bits.

Example 49

This example includes the elements of example 48, wherein the guest ISA corresponds to an ARMv7 ISA and the host ISA corresponds to an x86-64 ISA.

Example 50

This example includes the elements according to any one of examples 40 through 42, wherein the translator logic is included in a virtual machine (VM).

Example 51

This example includes the elements according to any one of examples 40 through 42, wherein the translator logic is included in at least one of a dynamic compiler and a static compiler.

Example 52

This example includes the elements according to any one of examples 40 through 42, wherein the maximum offset is 4096.

Example 53

This example includes the elements according to any one of examples 1 through 3, wherein the maximum offset is less than or equal to a minimum of a size of a guest kernel space and a size of a guest kernel reserved.

Example 54

This example includes the elements according to any one of examples 1 through 3, wherein the maximum offset is less than or equal to a minimum of a size of a guest kernel space, a size of a guest kernel reserved, a size of a host kernel space and a size of a created OF (overflow) zone.

Example 55

This example includes the elements according to any one of examples 1 through 3, herein the guest memory access instruction contains the base address plus the offset and the maximum offset corresponds to a first maximum offset that is less than or equal to a minimum of a size of a guest kernel space and a size of a host kernel space.

Example 56

This example includes the elements according to any one of examples 1 through 3, wherein the guest memory access instruction contains the base address minus the offset and the maximum offset corresponds to a second maximum offset that is less than or equal to a minimum of a size of a guest kernel reserved and a size of a created OF (overflow) zone.

Example 57

This example includes the elements of example 6, wherein a size of the OF zone is configured to limit an amount of host memory space occupied by the OF zone.

Example 58

This example includes the elements of example 14, wherein the maximum offset is less than or equal to a minimum of a size of a guest kernel space and a size of a guest kernel reserved.

Example 59

This example includes the elements of example 14, wherein the maximum offset is less than or equal to a minimum of a size of a guest kernel space, a size of a guest kernel reserved, a size of a host kernel space and a size of a created OF (overflow) zone.

Example 60

This example includes the elements of example 14, wherein the guest memory access instruction contains the base address plus the offset and the maximum offset corresponds to a first maximum offset that is less than or equal to a minimum of a size of a guest kernel space and a size of a host kernel space.

Example 61

This example includes the elements of example 14, wherein the guest memory access instruction contains the base address minus the offset and the maximum offset corresponds to a second maximum offset that is less than or equal to a minimum of a size of a guest kernel reserved and a size of a created OF (overflow) zone.

Example 62

This example includes the elements of example 19, wherein a size of the OF zone is configured to limit an amount of host memory space occupied by the OF zone.

Example 63

This example includes the elements according to any one of examples 27 through 29, wherein the maximum offset is less than or equal to a minimum of a size of a guest kernel space and a size of a guest kernel reserved.

Example 64

This example includes the elements according to any one of examples 27 through 29, wherein the maximum offset is less than or equal to a minimum of a size of a guest kernel space, a size of a guest kernel reserved, a size of a host kernel space and a size of a created OF (overflow) zone.

Example 65

This example includes the elements according to any one of examples 27 through 29, wherein the guest memory access instruction contains the base address plus the offset and the maximum offset corresponds to a first maximum offset that is less than or equal to a minimum of a size of a guest kernel space and a size of a host kernel space.

Example 66

This example includes the elements according to any one of examples 27 through 29, wherein the guest memory access instruction contains the base address minus the offset and the maximum offset corresponds to a second maximum offset that is less than or equal to a minimum of a size of a guest kernel reserved and a size of a created OF (overflow) zone.

Example 67

This example includes the elements of example 32, wherein a size of the OF zone is configured to limit an amount of host memory space occupied by the OF zone.

Example 68

This example includes the elements according to any one of examples 40 through 42, wherein the maximum offset is less than or equal to a minimum of a size of a guest kernel space and a size of a guest kernel reserved.

Example 69

This example includes the elements according to any one of examples 40 through 42, wherein the maximum offset is less than or equal to a minimum of a size of a guest kernel space, a size of a guest kernel reserved, a size of a host kernel space and a size of a created OF (overflow) zone.

Example 70

This example includes the elements according to any one of examples 40 through 42, wherein the guest memory access instruction contains the base address plus the offset and the maximum offset corresponds to a first maximum offset that is less than or equal to a minimum of a size of a guest kernel space and a size of a host kernel space.

Example 71

This example includes the elements according to any one of examples 40 through 42, wherein the guest memory access instruction contains the base address minus the offset and the maximum offset corresponds to a second maximum offset that is less than or equal to a minimum of a size of a guest kernel reserved and a size of a created OF (overflow) zone.

Example 72

This example includes the elements of example 45, wherein a size of the OF zone is configured to limit an amount of host memory space occupied by the OF zone.

Example 73

A computer readable storage device having stored thereon instructions that when executed by one or more processors result in the following operations including the method according to any one of claims 14 to 26 and 58 to 62.

Example 74

A system including at least one device arranged to perform the method of any one of claims 14 to 26 and 58 to 62.

Example 75

A device including means to perform the method of any one of claims 14 to 26 and 58 to 62.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system comprising:
   interface circuitry;
   instructions; and
   programmable circuitry to be programmed by the instructions to:
   reserve first memory addresses of a host system, the first memory addresses reserved for emulation of a guest system, the guest system based on a first instruction set architecture that is to use fewer bits to represent an address than a second instruction set architecture of the host system;
   reserve second memory addresses of the host system, the second memory addresses reserved for an emulated memory access instruction, the emulated memory access instruction associated with a calculated address corresponding to an overflow in the guest system; and
   set memory access privileges of the second memory addresses to cause a memory access exception after an address translation performed by the host system produces a translated address in the second memory addresses that does not cause an overflow in the host system.

2. The system of claim 1, wherein the first memory addresses start at memory address zero and are to emulate a memory address space of the guest system.

3. The system of claim 1, wherein a first quantity of addresses associated with the second memory addresses is based on a second quantity of memory addresses of a kernel reserved region of the guest system.

4. The system of claim 1, wherein the calculated address is a first calculated address, and the programmable circuitry is to reserve third memory addresses of the host system for a second emulated memory access instruction, the second emulated memory access instruction associated with a second calculated address corresponding to an underflow in the guest system, a first quantity of addresses associated with the third memory addresses based on a second quantity of memory addresses associated with a kernel space of the guest system.

5. The system of claim 1, wherein the emulated memory access instruction is a first emulated memory access instruction, and the programmable circuitry is to translate a memory access instruction of the guest system to a second emulated memory access instruction of the host system.

6. The system of claim 5, wherein the programmable circuitry is to add an address control prefix to the second emulated memory access instruction of the host system after a determination that the memory access instruction of the guest system includes an offset that is greater than a threshold value.

7. The system of claim 5, wherein the programmable circuitry is to translate the memory access instruction of the guest system based on an addition of an offset after a determination that the offset is less than or equal to a threshold value.

8. At least one computer readable storage device or storage disk comprising instructions to cause programmable circuitry to at least:
   reserve first memory addresses of a host system, the first memory addresses reserved for emulation of a guest system, the guest system including a first instruction set architecture that is to use fewer bits to represent an address than a second instruction set architecture of the host system;
   reserve second memory addresses of the host system, the second memory addresses reserved for an emulated memory access instruction, the emulated memory access instruction associated with a calculated address corresponding to an overflow in the guest system; and
   set memory access privileges of the second memory addresses to cause a memory access exception after an address translation performed by the host system produces a translated address in the second memory addresses that does not cause an overflow in the host system.

9. The at least one computer readable storage device or storage disk of claim 8, wherein the first memory addresses start at memory address zero and are to emulate a memory address space of the guest system.

10. The at least one computer readable storage device or storage disk of claim 8, wherein a first quantity of addresses associated with the second memory addresses is based on a second quantity of memory addresses of a kernel reserved region of the guest system.

11. The at least one computer readable storage device or storage disk of claim 8, wherein the calculated address is a first calculated address, and the instructions are to cause the programmable circuitry to reserve third memory addresses of the host system for a second emulated memory access instruction, the second emulated memory access instruction associated with a second calculated address corresponding to an underflow in the guest system, a first quantity of addresses associated with the third memory addresses based on a second quantity of memory addresses associated with a kernel space of the guest system.

12. The at least one computer readable storage device or storage disk of claim 8, wherein the emulated memory access instruction is a first emulated memory access instruction, and the instructions are to cause the programmable circuitry to translate a memory access instruction of the guest system to a second emulated memory access instruction of the host system.

13. The at least one computer readable storage device or storage disk of claim 12, wherein the instructions are to cause the programmable circuitry to add an address control prefix to the second emulated memory access instruction of the host system after a determination that the memory access instruction of the guest system includes an offset that is greater than a threshold value.

14. The at least one computer readable storage device or storage disk of claim 12, wherein the instructions are to cause the programmable circuitry to translate the memory access instruction of the guest system based on an addition of an offset after a determination that the offset is less than or equal to a threshold value.

15. A method comprising:
reserving, by executing an instruction with processor circuitry, first memory addresses of a host system, the first memory addresses reserved for emulation of a guest system, the guest system corresponding to a first instruction set architecture that is to use fewer bits to represent an address than a second instruction set architecture of the host system;
reserving, by executing an instruction with the processor circuitry, second memory addresses of the host system, the second memory addresses reserved for an emulated memory access instruction, the emulated memory access instruction associated with a calculated address corresponding to an overflow in the guest system; and
setting, by executing an instruction with the processor circuitry, memory access privileges of the second memory addresses to cause a memory access exception after an address translation performed by the host system produces a translated address in the second memory addresses that does not cause an overflow in the host system.

16. The method of claim 15, wherein the first memory addresses start at memory address zero and are to emulate a memory address space of the guest system.

17. The method of claim 15, wherein a first quantity of addresses associated with the second memory addresses is based on a second quantity of memory addresses of a kernel reserved region of the guest system.

18. The method of claim 15, wherein the emulated memory access instruction is a first emulated memory access instruction, and the method further includes translating a memory access instruction of the guest system to a second emulated memory access instruction of the host system.

19. The method of claim 18, further including adding an address control prefix to the second emulated memory access instruction of the host system after a determination that the memory access instruction of the guest system includes an offset that is greater than a threshold value.

20. The method of claim 18, further including translating the memory access instruction of the guest system based on an addition of an offset after a determination that the offset is less than or equal to a threshold value.

* * * * *